June 23, 1959 J. F. MÜLLER 2,891,735
AUTOMATIC CORE WINDING MACHINE
Filed Nov. 30, 1954 7 Sheets-Sheet 1

INVENTOR
J. F. MÜLLER
BY
ATTORNEY

June 23, 1959  J. F. MÜLLER  2,891,735
AUTOMATIC CORE WINDING MACHINE
Filed Nov. 30, 1954  7 Sheets-Sheet 2
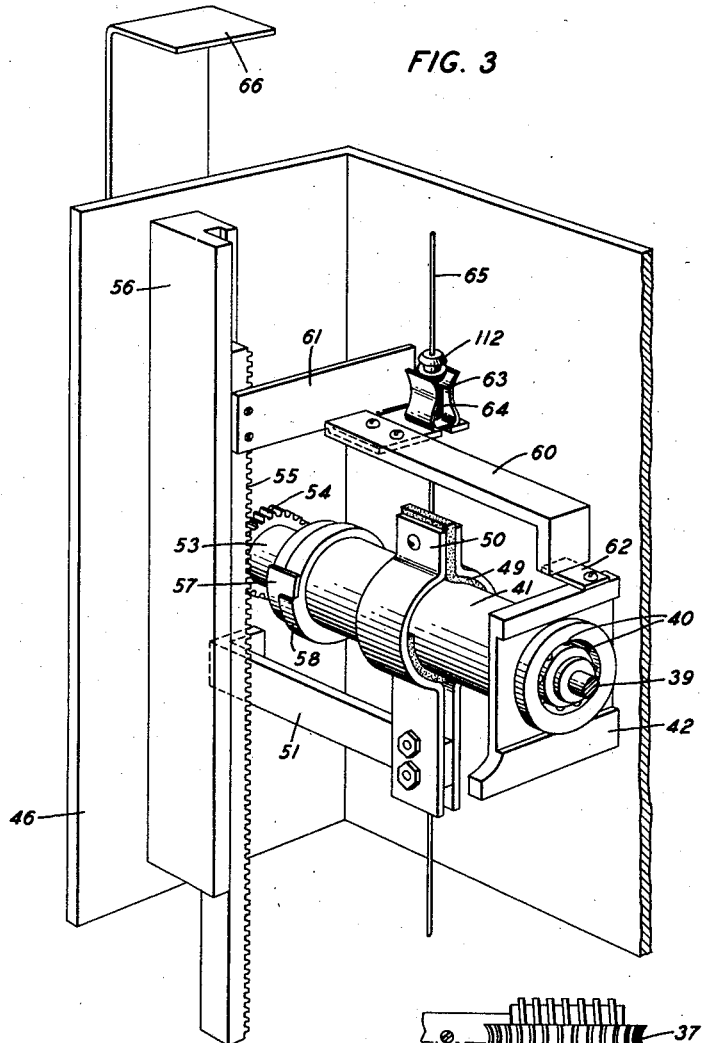
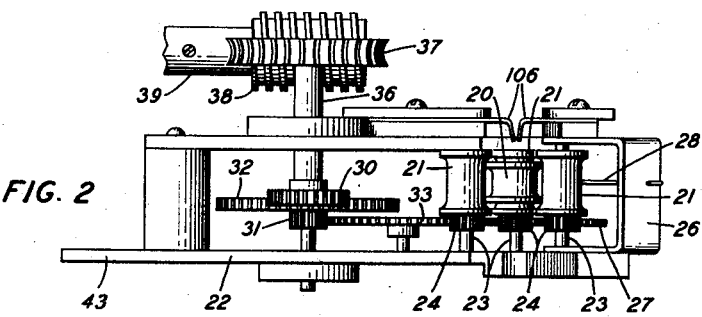
INVENTOR
J. F. MÜLLER
BY
ATTORNEY June 23, 1959  J. F. MÜLLER  2,891,735
AUTOMATIC CORE WINDING MACHINE
Filed Nov. 30, 1954  7 Sheets-Sheet 3
FIG. 4
FIG. 5
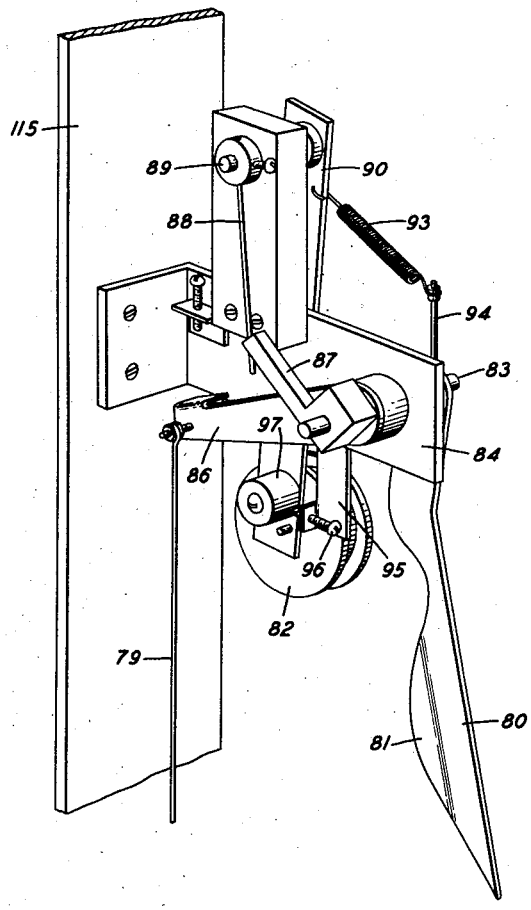
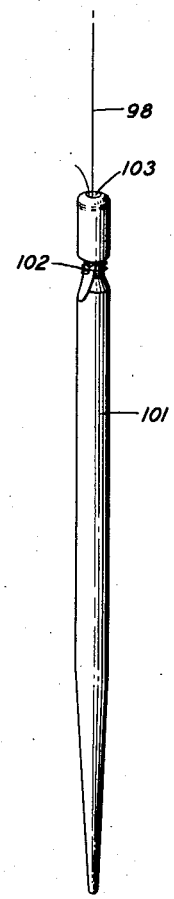
INVENTOR
J. F. MÜLLER
BY
ATTORNEY June 23, 1959  J. F. MÜLLER  2,891,735
AUTOMATIC CORE WINDING MACHINE
Filed Nov. 30, 1954  7 Sheets-Sheet 4

INVENTOR
*J. F. MÜLLER*
BY
*James D. Falk*
ATTORNEY

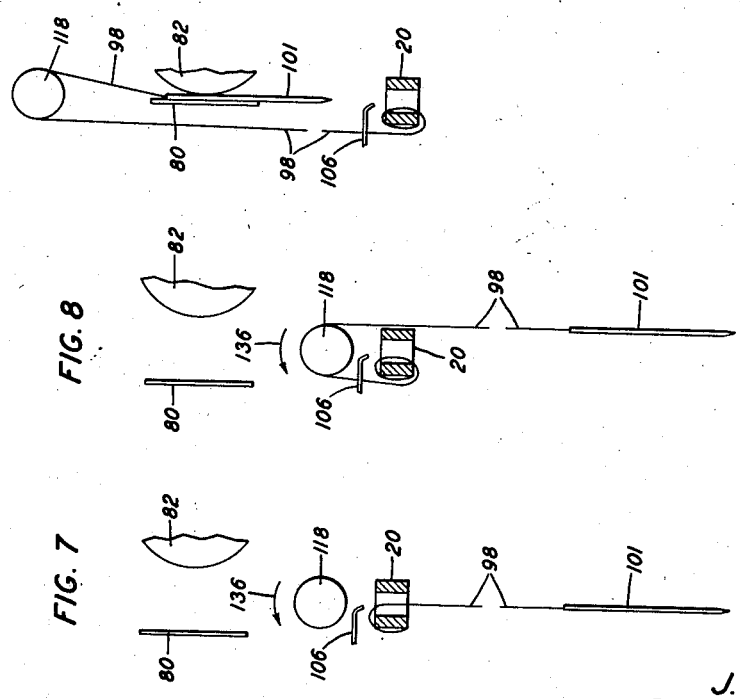

June 23, 1959   J. F. MÜLLER   2,891,735
AUTOMATIC CORE WINDING MACHINE
Filed Nov. 30, 1954   7 Sheets-Sheet 6

INVENTOR
J. F. MÜLLER
BY
ATTORNEY

June 23, 1959  J. F. MÜLLER  2,891,735
AUTOMATIC CORE WINDING MACHINE
Filed Nov. 30, 1954  7 Sheets—Sheet 7

INVENTOR
J. F. MÜLLER
BY
ATTORNEY

United States Patent Office 2,891,735
Patented June 23, 1959

2,891,735

AUTOMATIC CORE WINDING MACHINE

John F. Müller, Montclair, N.J., assignor to Bell Telephone Laboratories, Incorporated, New York, N.Y., a corporation of New York Application November 30, 1954, Serial No. 472,001

40 Claims. (Cl. 242—4)

This invention relates to core winding machines and more particularly to automatic core winding machines for very small magnetic cores.

Magnetic cores have recently become very prominent circuit elements in a wide variety of circuits such as shift registers, memory circuits, selector circuits, switching circuits, etc. Such cores are generally of a material having a substantially rectangular hysteresis loop, whereby information may be stored in the core depending on the remanent state of magnetization of the core after removal of storing pulses. In employment it is often desirable to apply various storage and/or control pulses to these cores to vary the magnetic state of the core. Some pulses that have become known in the art include set pulses, reset pulses, and advance or activating pulses. Additionally, it is desired to have an output winding coupled to each of these cores so that an output pulse may be induced therein on a reversal of the magnetic state of the magnetic core when an advance or activating pulse is applied to another winding of the core.

In order to capitalize to the fullest on the advantages of such core circuits, it is desirable that the cores be quite small so that very little driving power is required to shift their magnetic state. Cores having outside diameters of the order of ¼ inch, inside diameters of the order of ⅛ inch, and .2 inch high are exemplary of the size of cores that it is desirable to employ. Even smaller cores, having outside diameters down to the order of .090 inch and inside diameters down to the order of .060 inch have been employed in such circuits.

Presently such cores are wound by hand, various hand winding procedures being employed, such as that disclosed in J. A. Earl Patent 2,348,889, May 16, 1944. The usual technique for automatically winding a coil includes a bobbin which shuttles back and forth through the central hole in the core; the bobbin itself carries the wire. These cores, however, are so small that present bobbins cannot be accommodated and the bobbins are not capable of sufficient reduction in size to meet the small inside diameter found in these small toroidal cores.

It is an object of this invention to provide apparatus for winding coils on very small magnetic cores.

It is a further object of this invention to provide a core winding machine which is automatic in operation.

Other objects of this invention include providing an automatic core winding machine which will wind only a pre-determined number of turns of a coil, improving the tensioning of wire coils for small magnetic cores, and enabling coils to be wound on magnetic cores quickly, expeditiously, and efficiently.

These and other objects of this invention are attained in a specific embodiment thereof wherein the small magnetic core is located between rubber rollers on a core mounting carriage. The wire to be wound around the core is threaded through the center hole of the core and has a needle at its free end. The core and carriage are rotated about a wire carrier normally above the carriage so that a loop or bight of wire is placed onto the wire carrier which consequently may also be termed a loop carrier as its function is to transport in a vertical direction the wire and needle by the loop or bight which rests on a cantilever portion of the carrier. In the process of rotation of the carriage about the carrier, the bight or loop is placed upon the immobile carrier and one half a turn of the winding is attained on the core. The wire carrier is then lifted upwards, raising the needle until the needle is positioned between two needle guides which position the needle directly over the central hole in the core. The direction of the wire carrier is then reversed, lowering the needle through the central hole of the core. With the needle thus accurately positioned by the needle guides directly over the core hole, the wire carrier is retracted, releasing the wire which then, with the needle, falls freely through the core hole. The tensioning of the wire as the turn of the coil is completed is provided by the needle itself. Advantageously, before the wire is released it is held by wire tensioning fingers to assure a uniformity of tensioning.

The needle is advantageously thus dropped through the core into a tube which confines its motion, preventing the needle from excessive bouncing or oscillating at the end of the drop, which could create stresses in the wire capable of breaking the wire just at the needle. The confining tube is advantageously of glass or other insulating material to prevent a charge being induced on the tube and the insulation on the wire which would tend to hold the needle and interfere with the sequence of operation of the apparatus.

While the carriage and the core are being rotated around the wire carrier, the core is also advantageously rotated around an axis perpendicular to the core so that the coil being wound is evenly spaced along the core.

In one specific embodiment of this invention, the wire carrier comprises a cylindrical shaft having a hollow housing around a portion of the shaft, a helical spring around the shaft within the housing, and a crosspiece at right angles to the shaft and attached thereto at the remote end thereof. When the wire carrier approaches the core after the needle and wire have been positioned by the wire guide, the crosspiece is picked up by retracting fingers of a U-shaped retracting member to pull the shaft back into the housing and thus drop the wire off the carrier. When the wire has been released, the crosspiece is also released by the retracting member and the shaft returned to its normal position by the spring within the housing.

A locking member may also be carried by the housing and dropped onto the wire carrier to assure that the wire does not slip off the wire carrier prematurely. This may be of particular importance if more than one wire is being wound at a time. When a locking member is employed, a release is associated with the carrier so that the locking member is released before the wire carrier is retracted.

In another specific embodiment of this invention, the wire carrier is a single shaft having a pair of ridges on each side of a cylindrical portion on the top of the carrier; however, the lower surface beneath this cylindrical portion is slanted smoothly and no confining outer ridge is provided. When this wire carrier is employed, the wire remains on the carrier while the needle is positioned and dropped through the central hole in the core and while the wire carrier is returned to its lowest position. However, when the core and carriage start to rotate around the wire carrier, the motion of the core slides the wire off the carrier along the slanted portion to let the wire drop freely through the core; then the continued motion of the core and carriage around the core again picks up the wire and places it back on the upper cylindrical portion of the core, as in the prior embodiment.

The motion of the various parts of the apparatus may advantageously be derived from a drive cord or cable which is driven by a reversing motor or a pair of motors connected for operation in opposite directions. Control of the motors may be obtained by an electrical circuit including a microswitch operated on the lowest travel of the apparatus after the carriage has been rotated around the wire carrier and the wire placed back on the carrier, at which time the wire carrier is to move upwards, and including an electrical path closed by the needle itself when it is located between the two needle guides of the needle guide assembly. Thus the one needle guide may be insulated from the other and from the remainder of the apparatus, which may be grounded, so that the needle itself bridges the circuit between the two needle guides and applies a ground to the electrical circuit connected to the one needle guide.

The control circuits may include a group of magnetic core counters utilizing cores of the type having coils thereon wound by the apparatus of this invention. These counters may be set for any number of turns of the coil being wound, the outputs of the counters being combined in a magnetic core And circuit and applied back to the control circuit of the drive motors to interrupt that circuit and stop the apparatus. Advance or activating pulses for the magnetic core counters may be obtained from another microswitch which is contacted on each upward travel of the apparatus.

It is a feature of this invention that a core winding machine include a wire carrier and a carriage on which the core is positioned, the carriage and core being rotated around the wire carrier to obtain half of each turn of the coil and to locate the wire on the carrier.

It is a further feature of this invention that the core itself be rotated around its own axis a predetermined angle during each rotation of the carriage around the wire carrier to attain an even distribution of the coil being wound along the core.

It is another feature of this invention that a needle be provided at the free end of the wire, the needle being dropped through the central hole of the core to complete the turn and to provide the tensioning of the coil.

It is still another feature of this invention that the wire and the needle be raised by the wire carrier and that the needle be positioned and directed through the central hole of the core by a needle guide assembly comprising an elongated needle guide and a second needle guide. In accordance with this feature of the invention, the needle guide assembly is synchronized in operation with the motion of the wire carrier to allow passage of the wire carrier itself through the guide assembly but to be closed and in proper position for guiding the needle through the core when the needle is at the guide assembly.

Still another feature of this invention is that the needle itself be the bridging element to close an electrical circuit between the two needle guides of the guide assembly to control the operation of the drive motors.

It is a feature of one specific embodiment of this invention that the wire carrier be retractable to release the wire as the carrier approaches the core and carriage. In accordance with this feature of the invention, the wire carrier is retracted by a pair of retracting fingers and then returned by an internal spring after the wire has been released. Further in accordance with this feature of the invention, a locking member may be associated with the wire carrier to prevent the wire from prematurely slipping off the wire carrier, the locking member being released before retraction of the wire carrier.

It is a feature of another specific embodiment of this invention that the wire carrier comprise a shaft having a cylindrical upper portion with confining ridges or walls on both sides thereof, the lower surface below the cylindrical portion being slanted so that the outer end of the carrier is of narrower cross section than the main portion of the carrier, whereby the wire is released by slipping off the lower surface on the rotation of the core and carriage around the wire carrier.

It is a still further feature of this invention that control circuits be provided so that only a predetermined number of turns of the wire are wound in a coil on the core.

Still another feature of the invention is the employment of a confining tube of glass or other insulating material into which the needle drops when the wire is released from the wire carrier, thereby preventing breakage of the wire or the induction of charges on the insulation of the wire which would tend to restrain the wire and prevent the wire and needle from being withdrawn from the confining tube as the carriage and core are being rotated around the wire carrier and the wire being placed back onto the wire carrier.

It is still another feature of this invention that the rotation of the carriage and core around the wire carrier, the motion of the wire carrier, the opening and closing of the needle guide assembly, and the release of the wire from the wire carrier to let the wire and needle drop through the core be synchronized together. Thus it is a feature of this invention that a single drive cord or cable be provided having balls or knobs thereon engaging various clips and other parts of the various moving elements of the apparatus to synchronize the motion of the various elements together.

A complete understanding of this invention and of these and various other features thereof may be gained from consideration of the following detailed description and the accompanying drawing, in which:

Fig. 2 is a front view of the carriage assembly of the embodiment of Fig. 1 showing particularly the magnetic core and the support rollers therefor, the reel to which the wire is secured being omitted to enable the core, rollers, and gearing to be seen more clearly;

Fig. 3 is a perspective view of the drive shaft for the carriage in the embodiment of Fig. 1, the figure being drawn to a smaller scale than Fig. 2;

Fig. 4 is a perspective view of the needle guide assembly of the embodiment of Fig. 1;

Fig. 5 is a greatly enlarged perspective view of a needle that may be employed in the practice of this invention;

Figs. 7 through 12 are functional diagrams illustrating the sequence of operation of a core winding machine in accordance with the embodiment of this invention depicted in Fig. 1;

Figure 1:
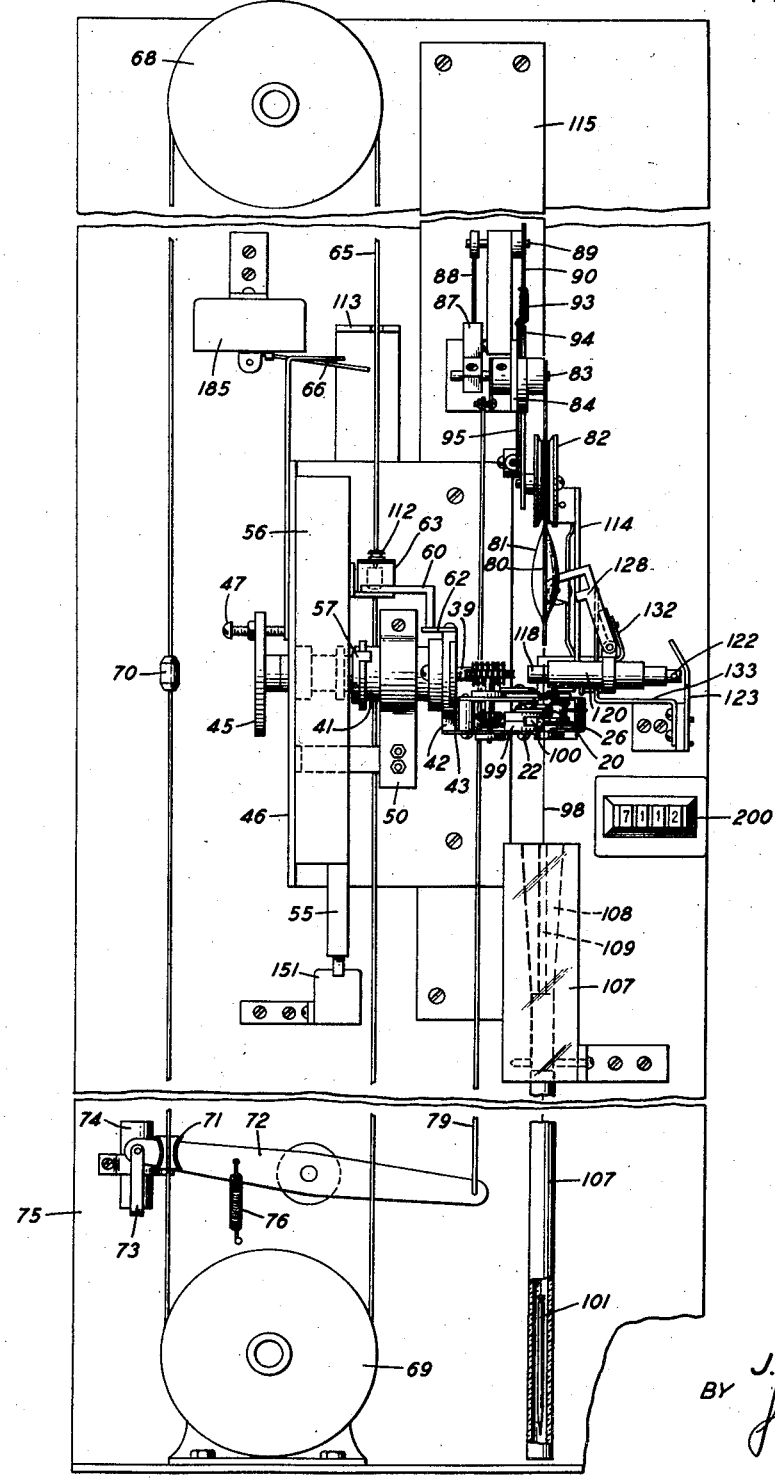
Fig. 1 is a front view of a core winding machine in accordance with one specific illustrative embodiment of this invention.

In the specific illustrative embodiment of this invention depicted in Figs. 1, 2, 3, 4, 5, and 6 of the drawing, a small toroidal magnetic core 20 on which it is desired to wind a coil is positioned between three rubber rollers 21, two of which are mounted on a carriage 22 by shafts 23, as best seen in Fig. 2. A small drive pinion 24 is also mounted on each of the shafts 23. Another shaft 23 is carried by a bracket 26 which can be rotated about the shaft of an intermediate gear 27. In this manner the bracket can be opened, withdrawing one of the three rubber rollers 21 to allow insertion of the magnetic core 20. The core is normally held tightly by the rubber rollers 21 due to the wire spring 28 which keeps the bracket closed and the wire roller 21 of the bracket tightly pressed against the core 20.

Also mounted on the carriage 22 is a gear train including the gears 30, 31, 32, and 33 which afford a hundred to one reduction so that for each rotation of the carriage 22 itself, as described more fully below, the rubber rollers 21 rotate the core 20 one one-hundredth of its circumference. The gear 30 is mounted by a shaft 36 on the other end of which is mounted a worm gear 37 meshing with a worm 38 carried on a shaft 39. As best seen in Fig. 3, which is drawn to a different scale than Fig. 2, the shaft 39 extends, by means of ball bearings 40, through a hollow outer shaft 41 to which is secured a bracket member 42. The carriage 22 is mounted on the lower edge of the member 42 as by screws extending through an integral extending piece 43 of the carriage 22, as seen in Fig. 1.

The inner shaft 39 may be manually rotated when it is desired to rotate the core 20 without winding a coil around the core, as when it is desired to space a number of coils on a single core, by a handle 45 to the other side of a side plate 46, as seen in Fig. 1. Normally the handle is prevented from moving by a set screw 47. If desired, the rotation of the core 20 by the shaft 39 between windings of distinct coils on the core can also be attained automatically.

A friction sleeve 49, as of felt, is maintained around the shaft 41 by a pair of clips 50 mounted from the side plate 46 by an arm 51. This friction sleeve serves to prevent the shaft 41 from rotating too fast.

A second hollow shaft 53 is also rotatably mounted on the inner shaft 39. The hollow shaft 53 has a pinion 54 secured thereto which mates with a rack 55 slidably mounted in a guide 56, mounted on the side plate 46. A pawl 57 is also mounted on the shaft 53 and mates with the single ratchet tooth 58 mounted on the first hollow shaft 41 to provide a unidirectional drive to rotate the carriage 22 and the core 20 around the axis of the shaft 39, as described further below.

A finger 60 supported by a cross member 61 from the gear 55 engages a stop 62 on the top of the member 42 to lock the member 42, and thus the carriage 22, in position. A spring clip 63 is also mounted on the cross member 61 and is engaged by a knob 64 carried by a drive cord 65. As described further below, the engagement of the knob 64 in the spring clip 63 affords motion of the rack 55 slidably in the guide 56. A stop member 66 is mounted by the side plate 46 to prevent further upward motion of the rack 55; it thus causes the knob 64 to be disengaged from the spring clip 63.

Turning back to Fig. 1, the drive cord 65 extends around an upper pulley wheel 68 and a lower wheel 69 attached to a driving motor, not shown. The motor may advantageously be a fractional horsepower reversing motor or a pair of motors connected to operate in opposite directions. Also carried on the drive cord 65 is a second knob 70 which engages a spring clip 71 mounted on an arm 72. Attached to the one end of the arm 72 is a soft iron piece 73 which is held by a magnet 74 mounted on the back plate 75 of the apparatus. The magnet 74 and iron piece 73 thus serve to hold the arm 72 in the position indicated in Fig. 1 of the drawing when the knob 70 does not engage the clip 71. A helical wire spring 76 extends between the arm 72 and the back plate 75 to hold the arm in its other position when the knob 70 is engaged in the clip 71 and, due to the downward motion of the knob 70 on the drive cord 65, the iron piece 73 has been pulled away from the magnet 74.

At the other end of the arm 72 is a drive rod 79 extending up to a mechanical linkage for opening the needle guide assembly, best seen in Fig. 4. The needle guide assembly comprises a main elongated needle guide 80 having a pair of wing portions 81, so that the guide 80 has a basically V-shaped cross section for determining the position of the needle. Positioned opposite the main needle guide 80 is a secondary needle guide 82 which in this specific embodiment is a wheel. The needle guide 80 is mounted by a shaft 83 extending through a support bracket 84. When the rod 79 is pulled down by the arm 72, the shaft 83 is rotated by the linkage member 86 causing the elongated needle guide 80 to be rotated away from the guide wheel 82, thus opening up the guide assembly. At the same time a finger 87 carried by the shaft 83 bears against a rod 88 causing a second shaft 89 to rotate and to move the guide wheel 82 away from the needle guide 80. The guide wheel 82 is carried on a shaft supported on a linkage member 90 mounted on the shaft 89.

When the arm 72 is moved to its other position by the knob 70 carried on the drive cord 65, the rod 79 is moved upwards, rotating the shaft 83 through the linkage member 86 in the opposite direction and moving the needle guide 80 back to its closed position. At the same time the finger 87 is removed from the rod 88 allowing the guide wheel 82 to be returned to its closed position by a spring 93 extending between the member 90 and a rod 94 carried on the support bracket 84. A stop 95, including a set screw 96 which bears against a thick washer 97 mounted on the member 90, determines the closed position of the guide wheel 82.

The wire 98 to be wound on the core has its one end secured to a very small reel 99, seen in Fig. 1. The reel 99 is mounted on the carriage 22 but has not been shown in Fig. 2 so that the rubber rolls 21, gears and pinions of the carriage 22 might readily be seen in that figure. The wire may be very small, as of the order of .0025 inch diameter; No. 42 wire has been advantageously employed for the coils on a number of cores. The one end of the wire 98 is secured to the reel 99, as by a piece of tape 100 or in other ways known in the art. At the free end of the wire 98 is the needle 101, shown greatly enlarged in Fig. 5. The needle, which may be of steel, has a portion 102 of decreased diameter adjacent its one end and a hole 103 extending axially through the needle at this end up to the portion 102 of decreased diameter. I have found that the needle 101 may be fully and tightly secured to the wire 98 by threading the end of the wire through the axial hole 103, winding it around the portion 102 of decreased diameter for a few turns, and then returning the wire back through the axial hole 103.

The wire 98 extends from the reel 99, through wire tensioning fingers 106 mounted by the carriage 22 and seen in Fig. 2, through the core 20, and into a glass tube 107, seen in Fig. 1. The glass tube 107 advantageously has a funnel-shaped opening 108 adjacent the carriage 22 and a side slot 109, indicated by dotted lines in Fig. 1, to allow the needle 101 to be carried upwards, as described further below.

Figure 6:
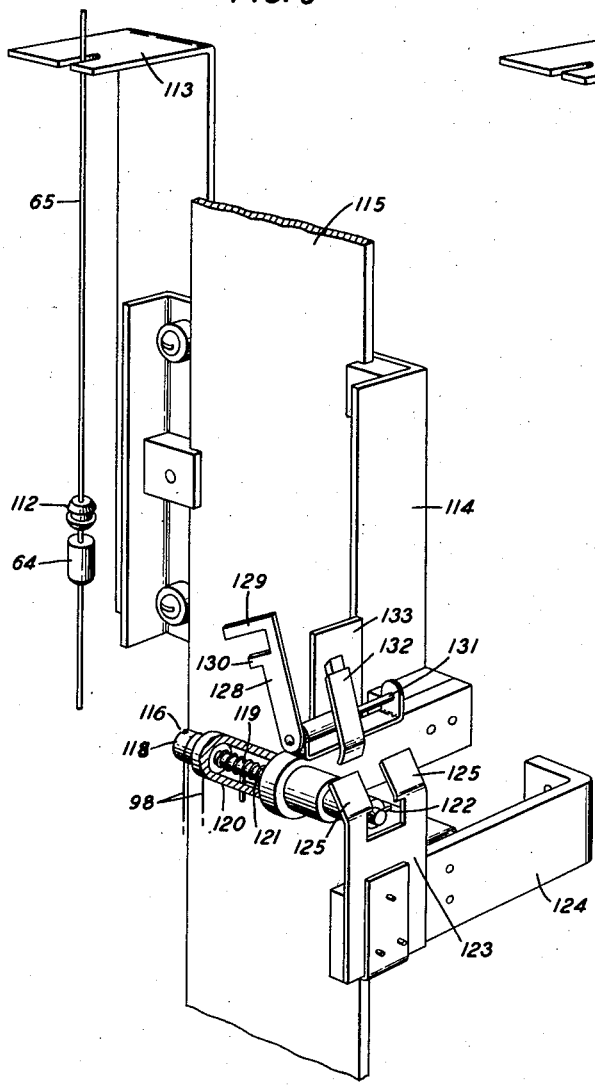
Fig. 6 is a perspective view of the wire carrier and associated elements of the embodiment of Fig. 1.

When the drive cord 65 moves upward and after the knob 64 carried thereon has disengaged from the spring clip 63 due to the stop 66, a rubber knob 112 also carried on the drive cord 65 engages a member 113 secured to a slidable trolley 114 carrying the wire carrier assembly, best seen in Fig. 6. The trolley 114 is slidably mounted on a plate 115 secured to the back plate 75 so that the trolley and the wire carrier assembly are raised by the rubber knob 112 carrying the member 113 upward and return due to gravity when the direction of the drive cord 65 is reversed. In this specific embodiment of the invention, the wire carrier assembly includes a wire carrier 118 having a groove 116 in its end. The carrier 118 is mounted on a shaft 119 extending through a hollow housing 120; a helical wire spring 121 is positioned around the shaft 119 within the housing, as seen in Fig. 6. The other end of the shaft 119 has a crosspiece 122 attached thereto. A U-shaped retracting member 123 is mounted on a bracket 124 secured to the back plate 75, the retracting member having two upright portions 125 initially slanted towards the wire carrier 118 and separated by a distance less than the length of the crosspiece 122. The lower parts of the upright portions 125 are not slanted and are separated by a distance greater than the length of the crosspiece 122. In this manner when the wire carrier assembly is being lowered during operation of the apparatus, the crosspiece 122 is picked up by the two upright portions 125 of the retracting member 123 and the wire carrier 118 is pulled back into the hollow housing 120, thereby causing the wire priorly carried on the carrier 118 to be dropped. After the wire is dropped, the wire carrier is released by the retracting member 123 and returned to its initial position due to the spring 121.

While the wire is on the wire carrier, it is locked against premature release by a locking member 128 having a first finger 129 that extends into the edge groove 116 and a second finger 130 that rests on the carrier 118. The locking member 128 is supported on a shaft 131 mounted on the trolley 114. A release finger 132 is also mounted on shaft 131 and cooperates with a release member 133 mounted by plate 115 to turn the shaft 131 sufficiently to release the locking member 128 before the crosspiece 122 is engaged by the upright portions 125 of the retracting member 123. The carrier assembly is depicted in Fig. 6 with the locking member released, after the wire has been released from the carrier 118, the carrier 118 returned to its initial position by the spring 121 and the next turn of wire already placed on the carrier, as described further below.

Before describing the detailed operation of the specific embodiment of this invention described above and depicted in Figs. 1 through 6 of the drawing, it will be advantageous to describe the mode of operation and the manner in which the wire 98 is wound around the core 20 with reference to the sequence depicted in Figs. 7 through 12. As seen in Fig. 7, the needle 101 with the wire 98 attached thereto can be considered as initially dropped through the central hole in the core 20. The core 20 is then rotated counterclockwise, as indicated by the arrow 136 around the wire carrier 118. When the core 20 returns to its initial position, the needle 101 is now outside the core, as seen in Fig. 8, and half of the next turn of wire has been placed on the core. Additionally, the wire 98 is now looped around the wire carrier 118. The wire carrier 118 then moves vertically through the opened needle guides 80 and 81 and carries the needle 101 and wire 98 up with it. After the carrier 118 has passed through the guides 80 and 82, the guides close together and position the needle 101 directly above the central hole in the core 20, as seen in Fig. 9.

With the needle 101 thus directly above the central hole in the core 20, the direction of the wire carrier 118 is reversed and the wire and the needle directed through the core. When the needle is about one inch above the core, the carrier 118 is retracted so that the needle 101 and wire 98 can fall free, as seen in Fig. 10. The wire has been held by the tensioning fingers 106, as seen in Figs. 8, 9, 10, and 11, to assure an even tension on the turns of the coil being wound, but when the needle is dropped the wire is pulled free of the fingers 106 and the turn of the coil completed, as seen in Fig. 12. With the turn completed and the wire carrier 118 in its original position, the apparatus is ready to wind the next turn. During the 360° rotation of the core 20 around the wire carrier 118, the core itself revolves, in this specific embodiment, 3.6° about an axis perpendicular to the plane of the core.

It is to be noted that the needle itself is employed to apply the correct tension to the wire as the core is being wound. I have found the weight of the needle to be sufficient to tension the wire, thus obviating the need for externally applied tensioning.

The sequence of operation depicted schematically in Figs. 7 through 12 and described briefly above can be seen in a detailed description of the operation of the apparatus depicted in Figs. 1 through 6. Although this operation is advantageously attained automatically, through control circuits as described below, no mention of the control features will be made at this time. The apparatus in Figs. 1 through 6 is depicted at the instant during the sequence of operation shown in Fig. 8, namely when the core 20 has been returned to its initial position after being rotated around the carrier 118 and the wire 98 is over the carrier 118. At this time the drive cord 65 starts to travel so that knob 64 carries spring clip 63 upward. As the spring clip 63 is connected to the rack 55 by the member 61, the rack also moves upward causing pinion 54 to rotate clockwise around the inner shaft 39. The pawl 57 is thus rotated clockwise on the ratchet member 58 until it slips back over the single ratchet tooth. This rotation of the pinion 54 and sleeve 53 is ineffectual though in producing other motion in the apparatus.

When the rack 55 hits the stop 66, the knob 64 is released from the spring clip 63. Almost simultaneously, the rubber knob 112 engages the member 113 causing the trolley to slide upward on plate 115, thereby lifting up the wire carrier 118, the wire 98, and the needle 101. As the wire carrier assembly is lifted, the release finger 132 comes clear of release member 133, thereby allowing the locking member 128 to drop onto the wire carrier 118 and lock the wire 98 thereon. The wire carrier 118 is lifted between the opened needle guide assembly until the needle itself is between the guides 80 and 82. At this time the other knob 70 on the drive cord 65 has engaged the spring clip 71 causing the arm 72 to shift its position and close the needle guides 80 and 82.

When the needle 101 is located between the closed guides 80 and 82 and thus positioned directly over the central aperture in the core 20, as indicated in Fig. 9, the direction of the drive cord 65 reverses. The carrier assembly now falls, under gravity, with the member 113 resting on the knob 112. In falling the carrier locking member 128 is released as the release finger 132 is pushed upwards by the member 133 and the carrier 118 itself is then retracted as the crosspiece 122 is engaged by the upright members 125 of the retracting member 123. The wire and needle are thus released; this is indicated at Fig. 10 in the sequence of operation of the apparatus. On release of the needle 101, it falls through the central aperture of the core 20 and, due to the weight of the needle, the wire is released from the tensioning fingers 106 and is also completely pulled through the core, as shown in Figs. 11 and 12.

On dropping through the core 20 the motion of the needle 101 is confined by the tube 107. If not thus confined, the needle 101 will have a tendency to bounce and oscillate excessively, creating stresses that can break the wire just at the needle. Additionally, it is advantageous that the tube 107 be of some insulating or vitreous material, such as glass or a plastic; if a metallic tube is employed, a charge is induced on it and the wire insulation which will hold the needle during the next phase of the operating sequence of the apparatus.

Advantageously the carrier 118 is retracted and the needle 101 and wire 98 dropped through the core 20 before the knob 64 again engages the spring clip 63 during the downward motion of the drive cord 65. With the knob 64 within the clip 63, the rack 55 is driven downward again, turning the pinion 54 and the shaft 53. Now, however, the direction of rotation of the shaft is such that the pawl 57 positively engages the ratchet tooth 58 to drive it and rotate the shaft 41 around the inner shaft 39. As the carriage 22 is directly connected to the shaft 41 through the bracket member 42, it rotates about the shaft 39 and the worm 38, thereby placing the wire 98 back upon the carrier 118 and positioning the needle 101 again to one side of the core 20 in preparation for the next turn of the coil. Additionally, through the gear linkage including the worm 38, gears 37, 30, 31, 32, 33, 27, and 24, the rubber rollers 21 rotate the core itself one one-hundredth of a revolution in preparation for the next turn.

When the finger 60 engages the stop 62, the carriage 22 has been returned to its initial position and the drive cord 65 is ready to reverse and repeat the sequence of operations just described.

Figure 13:
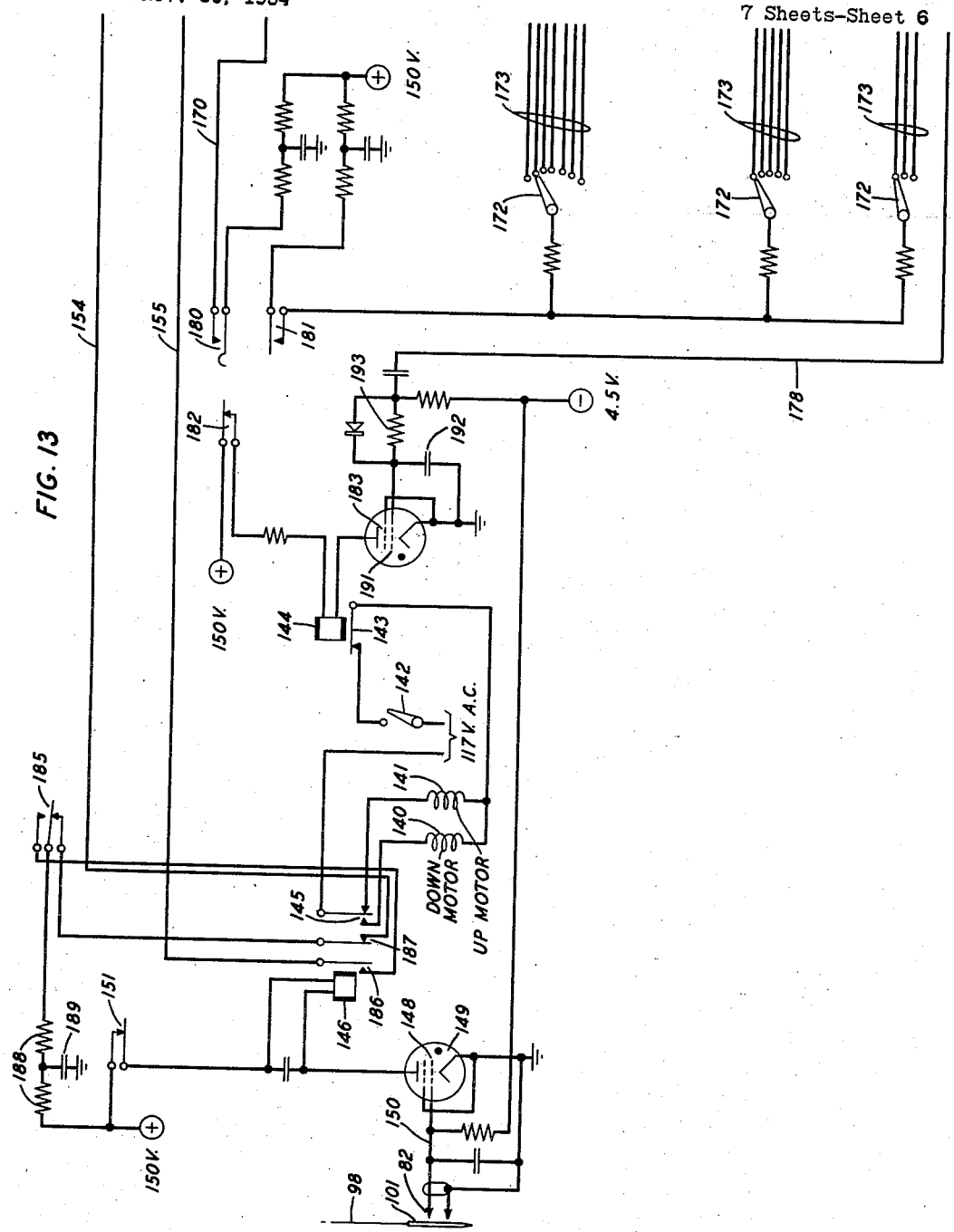
Figs. 13 and 14 are a schematic representation of motor control and counting circuits that may be employed in specific embodiments of this invention.
Figure 14:
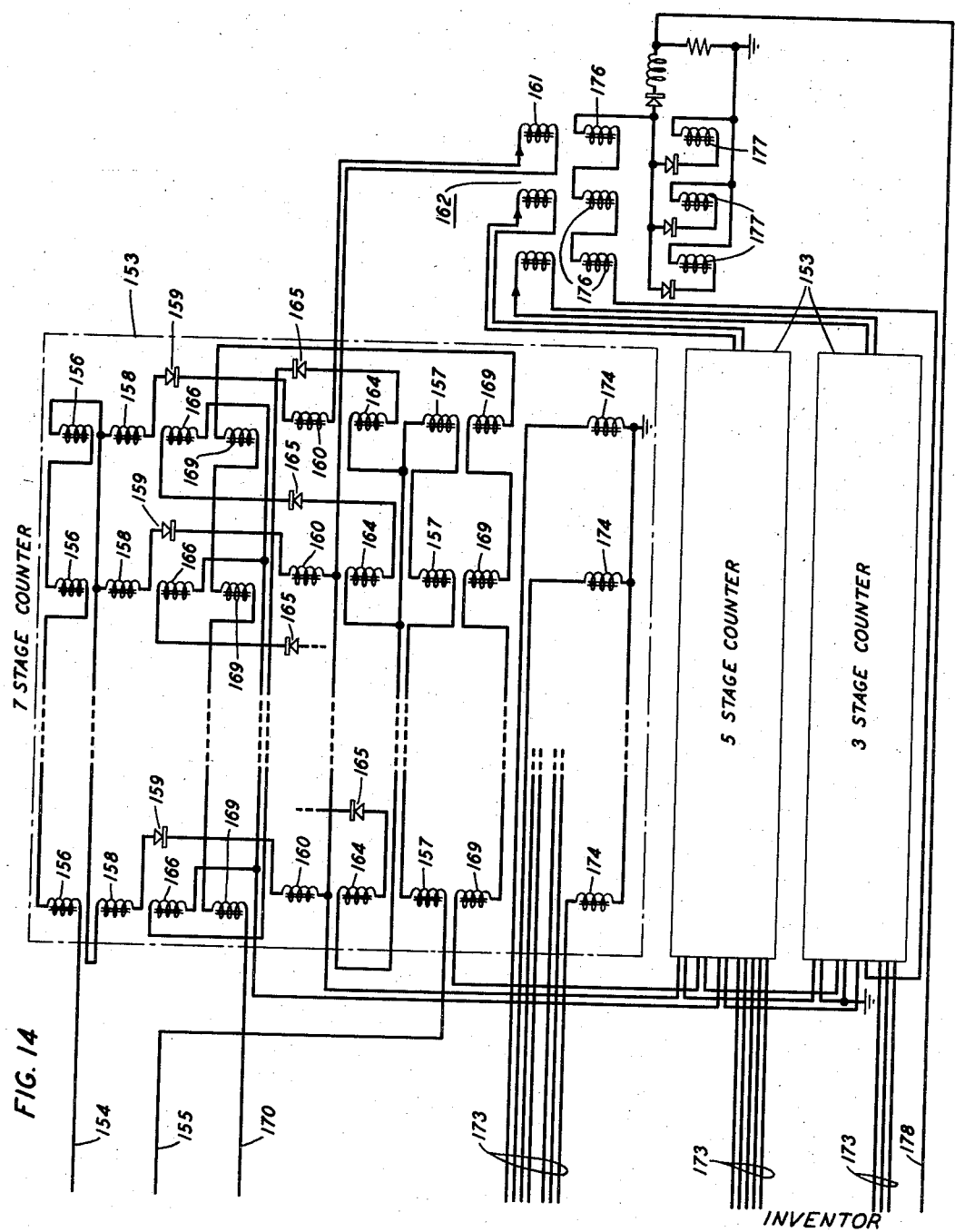

In accordance with an aspect of this invention, the apparatus described above is entirely automatic in operation. One operating circuit that may be employed is illustrated in Figs. 13 and 14, which are to be considered as if placed side by side. The control circuitry is in two parts; first the motor circuit for controlling the direction of the drive cord 65 and second a counting and control circuit whereby the apparatus winds only a predetermined number of turns on the core.

Turning first to the motor circuit, in the specific embodiment depicted in Fig. 13, a pair of motors 140 and 141 are employed, the motors being oppositely connected so that motor 140 is the down motor and motor 141 is the up motor, the down and up referring to motion of the knob 64. The motors are indicated on the drawing by their operating windings. The motors are connected to a source of alternating current voltage through a switch 142, normally closed contacts 143 of a relay 144, and the transfer contacts 145 of a relay 146; for the moment we shall ignore the operation of the relay 144. When the apparatus is in the position depicted in the drawing, the up motor is to operate and the circuit is as shown in Fig. 13 with the transfer contact 145 connected to the motor 141. Closure of the switch 142 accordingly starts the up motor 141. The motor 141 pulls the drive cord 65 upward until the needle 101 makes contact with the wheel needle guide 82. In accordance with an aspect of this invention, the needle guide 82 is of insulating material except for a conducting strip in the groove of the wheel which is connected through the member 90 and a wire lead 150, not shown in Figs. 1 or 4, to a control electrode 148 of a gas tube 149 which is advantageously a thyratron. Advantageously, the needle guide 82 may be a brass ring having insulating flanges attached thereto.

When the needle 101 is between the needle guides 82 and 80, it closes a circuit therebetween by applying ground to the lead 150; advantageously the needle guide 80 and, in fact, the whole apparatus except for the guide 82 is grounded by a suitable connection to ground potential. As the wire 98 is insulated, the ground cannot be applied to the lead 150 until the needle 101 is itself electrically bridged between the needle guide 82 and some other component of the apparatus, which is most advantageously the other needle guide 80.

Grounding of the lead 150 applies ground potential to the control electrode 148 which had priorly been held at a negative bias by a suitable voltage supply. This fires the thyratron causing current to flow through the winding of relay 146, operating it and transferring the contact 145 from the up motor 141 to the down motor 140, thereby causing the drive cord 65 to reverse direction. The drive cord 65 will now go in the opposite direction until the rack 55, as seen in Fig. 1, contacts a microswitch 151 mounted on the back plate 75. Opening of the contacts 151 of this switch opens the anode circuit of the thyratron 149 putting the tube out and releasing the relay 146, thereby causing the contact 145 to transfer again to the up motor. This cycle of operation is then repeated.

In accordance with an aspect to this invention, as noted above, the number of turns desired to be wound on the core can be preset into the control circuit and the circuit will turn itself off after that number of turns have been wound. This is attained through the employment of three magnetic core counter circuits 153, the three counter circuits including a seven stage counter, a five stage counter, and a three stage counter. Each of these counter circuits is of the type disclosed in application Serial No. 425,845, filed April 27, 1954, of M. Karnaugh, wherein each stage of the counter comprises a pair of cores, the two cores having activating pulses applied thereto in alternate phases. The activating windings of the cores are connected in series, the output windings of the cores for that activating phase being connected in parallel to the last of the series activating windings. In Fig. 14, the alternate activating or advance phases are supplied over leads 154 and 155 to series connected activating windings 156 and 157, respectively. The output windings 158 of the upper cores are each connected to the last activating winding 156 and, through a diode 159, to an input winding 160 of the next lower core. The input winding 160 of the last core of the last stage is connected to an input winding 161 of an And circuit 162 of the type disclosed in application Serial No. 425,875, filed April 27, 1954, of F. T. Andrews, Jr. Similarly, the output windings 164 of the lower cores are each connected to the last of the series connected activating windings 157 and, through a diode 165, to the input winding 166 of the next upper magnetic core, except that the output winding of the last lower magnetic core is connected to the input winding of the first upper magnetic core.

Additionally, each core in the counters 153 has a reset winding 169 thereon, all of the reset windings being connected in series and to a reset lead 170.

When it is desired to set the counter so that the apparatus will wind only a specific number of turns, the selector switches 172 are turned to particular ones of the set leads 173 which are individually connected to set windings 174 on the lower cores of each stage of the circuits 153. By proper choice of which cores in the three counters 153 are initially set, any number of operating cycles of the apparatus from two to one hundred six may be chosen. Thus, if it is desired to wind only twelve turns on the core 20, the first counter 153 will have its third stage lower core set, the second counter its fourth stage lower core, and the third counter its first stage lower core. Then after eleven cycles of operation and eleven activating pulses on both activating leads 154 and 155, outputs will appear simultaneously at all three counters and be applied to the input windings 161 of the And circuit 162. The activating windings 176 are connected in series to the activating pulse lead 155. The three output windings 177 are connected in parallel between the last activating winding 176 and ground. As further described in the above-mentioned Andrews application, an output pulse appears on the output lead 178, which is in shunt with the output windings 177, only when all three cores had been set so that voltages appear across all three output windings 177 on application of the activating pulse to the activating windings 176. Hence, the twelfth pulse on lead 155 produces an output on lead 178.

After the selector switches 172 have been set, keys 180, 181, and 182 are operated. These keys may advantageously be on the same shaft but so arranged that key 181 always is closed after key 180. Closure of key 180 applies a reset pulse to the reset lead 170 to reset all the cores in the counters 153; closure of key 181 applies a set pulse through the selected contacts of switches 172 and set leads 173 to set particular stages of the counters 153. Operation of key 182 opens a circuit including the winding of relay 144 and a gas tube, such as a thyratron, 183, thereby assuring that the thyratron is extinguished and normally closed contacts 143 are closed. The counter control circuit is now ready for operation of the apparatus which can be initiated, as described above, by closure of the switch 142.

On each upward trip of the rack 55, seen in Fig. 1, it closes another microswitch 185 which, together with contacts 186 and 187 of relay 146, resistors 188 and a condenser 189, applies activating pulses alternately to the leads 154 and 155 to step the counter. When an output appears on lead 178 from the And circuit 162, it is applied to the control electrode 191 of thyratron 183 through a pulse stretcher circuit including condenser 192 and resistor 193. The positive voltage thus applied in place of the normal negative bias on that electrode causes the tube to fire, thereby completing the circuit through relay 144 and opening contacts 143. This shuts off the motors 140 and 141 and stops the operation of the apparatus.

If desired, the apparatus can be started again to wind the same number of turns on another core, after that new core has been inserted between the rollers 21 of the carriage 22, merely by operating the switches 180, 181, and 182.

Figure 15:
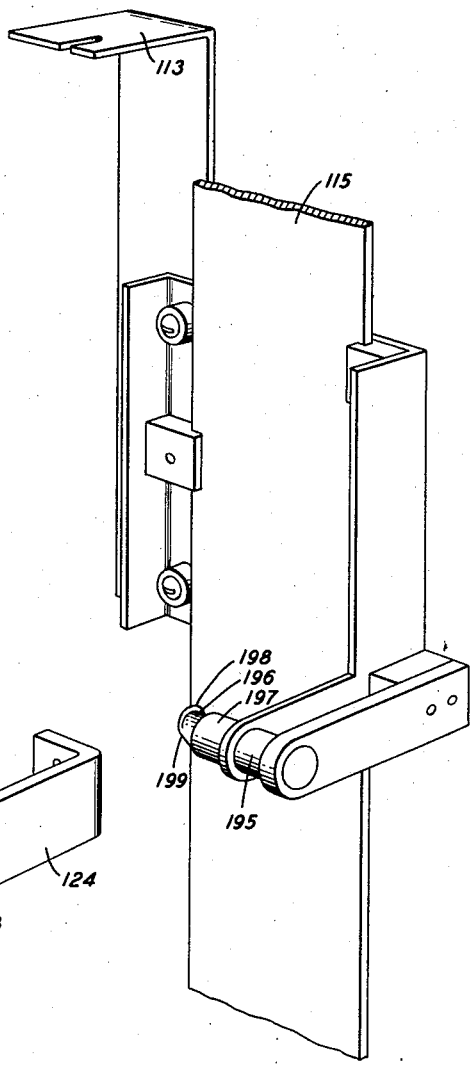
Fig. 15 is a perspective view of another wire carrier and associated elements in accordance with another specific embodiment of this invention.

In the above described embodiment of this invention, the wire 98 is dropped from the wire carrier 118 before the carriage 22 is rotated due to the retracting action afforded by the cooperation of the crosspiece 122 and the retracting member 123. While this arrangement is advantageous, other arrangements may be utilized in the combination of this invention. Thus in Fig. 15 there is depicted a wire carrier 195 in accordance with another specific embodiment of this invention. The wire carrier 195 has, at its end, an upper cylindrical portion 196 located between two side walls or ridges 197 and 198. Side wall 197 extends completely around the carrier 195. The ridge 198, however, extends only about half-way around the carrier. In this specific embodiment, the bottom surface 199 of the carrier 195 directly beneath the upper surface 196 is cut at an angle.

In operation the wire 98 is located on the upper surface 196 while the carrier is raised and the needle 101 positioned by the needle guide assembly. The carrier is then lowered and the wire stays on the carrier 195 while the needle extends through the core 20, the wire being restrained from side motion by the walls 197 and 198. However, when the core 20 and carriage 22 are rotated around the wire carrier 196, the wire slides off the carrier, being in effect pulled off the lower portion 199.

If desired, more than one wire may be wound on a core at a time. I have found that when a double winding is made the weight of the steel needle 101 is not heavy enough to provide the requisite tension. Accordingly, when more than one wire is being wound on a coil, I have found it advantageous to employ a needle having a tungsten point welded to the steel shaft, whereby the weight of the needle is increased. Because of the locking member 128, in the embodiment disclosed in Fig. 6, or the ridge or wall 198, in the embodiment of Fig. 15, the wires are prevented from slipping off the wire carrier prematurely even though a number of wires are being carried on the carrier at one time.

A counter 200 may be mounted on the back plate 25 of the apparatus and connected to the counter circuits, as is known in the art, to enable visual observation of the number of turns of the coil wound, if desired.

It is to be understood that the above-described arrangements are illustrative of the application of the principles of the invention. Numerous other arrangements may be devised by those skilled in the art without departing from the spirit and scope of the invention.

What is claimed is:

1. A machine for winding toroidal magnetic cores with wire comprising a rotatable carriage for supporting a toroidal magnetic core, a wire loop carrier, means connecting one end of a wire to be bound on the core to said carriage, a needle connected to the free end of the wire, means for rotating said carriage around said loop carrier to place an intermediate loop portion of said wire on said carrier and to place a partial turn of wire on the core, means for raising said loop carrier so that said needle is positioned for insertion through the central hole in the core, and means for lowering said loop carrier and inserting said needle and wire through the central hole in the magnetic core thereby to complete the partial turn of wire about the magnetic core.

2. A machine for winding toroidal magnetic cores with wire comprising a rotatable carriage for supporting a toroidal magnetic core, a retractable wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, a needle guide assembly located above the core, means for raising said loop carrier so that said needle is positioned by said needle guide assembly for insertion through the central hole in the core, means for lowering said wire loop carrier, and means for retracting said carrier to drop said needle and wire through the central hole of the magnetic core thereby to complete the partial turn of winding about the magnetic core which was initiated by rotation of said carriage.

3. A machine for winding toroidal magnetic cores with wire comprising a rotatable carriage for supporting a toroidal magnetic core, a wire loop carrier having a cylindrical upper portion and a confining outer edge adjacent said upper portion, the lower surface of said carrier below said upper portion being slanted, means connecting one end of a wire to be wound on the core to said carriage, a needle connected to the free end of the wire, means for rotating said carriage around said loop carrier to place an intermediate loop portion of said wire on said carrier and to place a partial turn of wire on the core, a needle guide assembly located above said core, means for raising said loop carrier so that said needle is positioned by said needle guide assembly for insertion through the central hole in the core, and means for lowering said loop carrier to lower said needle through the central hole in the magnetic core, the wire sliding off the lower surface of said loop carrier to drop said needle and said wire on the next rotation of said carriage around said wire loop carrier thereby to complete the partial turn of wire which was initiated by the last rotation of said carriage.

4. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place in intermediate loop portion of said wire on said carrier and to place a partial turn of wire on the core, means for rotating the core a predetermined angle about the axis of the core upon rotation of said carriage around said carrier, a needle guide assembly, means for raising said carrier so that said needle is positioned by said guide assembly, and means for lowering said carrier and inserting said needle and wire through the central hole in the magnetic core thereby to complete the partial turn of wire about the magnetic core.

5. A machine for winding toroidal magnetic cores with wire comprising a needle connected to the free end of the wire, a rotatable carriage for supporting a toroidal magnetic core, a wire loop carrier, means for rotating said carriage around said loop carrier to place an intermediate loop portion of said wire on said carrier and to place a partial turn of wire on the core, means for raising said loop carrier so that said needle is positioned for insertion through the central hole in the core, a needle guide assembly directly above the core for locating said needle secured to the wire directly above the central aperture in the core, means for lowering said carriage and dropping said wire, and a confining tube of an insulating material directly beneath the central aperture in the core for confining the motion of said needle when said needle is dropped through the central aperture in the core.

6. A machine for winding toroidal magnetic cores with wire comprising a rotatable carriage for supporting a toroidal magnetic core, said carriage including a plurality of rollers mounted on shafts having pinions secured thereto, one of said shafts being mounted on a bracket spring biased to maintain the core between said rollers, said bracket being hinged to allow said bracket to be opened to insert and withdraw the core from said rollers, means connecting one end of a wire to be wound on the core to said carriage, a needle connected to the free end of the wire, a wire loop carrier, means for rotating said carriage around said loop carrier to place an intermediate loop portion of said wire on said carrier and to place a partial turn of wire on the core, means for rotating the core through a predetermined angle about its own axis on rotation of said carriage around said wire loop carrier, said last mentioned means including said pinions secured to said shafts, a needle guide assembly, means for raising said loop carrier so that said needle is positioned by said needle guide assembly for insertion through the central hole in the core, and means for lowering said loop carrier and inserting said needle and wire through the central hole in the magnetic core thereby to complete the partial turn of wire about the magnetic core.

7. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, a needle guide assembly located above the core and including a pair of guide elements, said needle guides comprising conductive members insulated each from the other of said needle guides, means for raising said carrier so that said needle is positioned by said pair of guide elements for insertion through the central hole in a toroidal magnetic core supported by said rotatable carriage, motor means for lowering said wire loop carrier so that said needle extends through the central hole in the core after said needle has been positioned by said pair of guide elements, and a control circuit for reversing the direction of said motor means, said control circuit including said conductive members of said needle guide whereby a portion of said circuit is bridged by said needle when the said needle extends between said needle guides.

8. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for placing said wire on said wire loop carrier, a needle guide assembly located above said core, means for raising said wire loop carrier so that said needle is positioned by said guide assembly for insertion through the central hole in a toroidal magnetic core supported by said carriage and for lowering of said carrier to insert said needle and wire into the central aperture of the core, said last mentioned means including motor means and a control circuit for reversing the direction of said motor means, said control circuit including said needle guide assembly whereby a portion of said control circuit is bridged by said needle when said needle contacts said needle guide assembly.

9. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, said rotatable means including a first shaft, a hollow shaft mounted on said first shaft and including a ratchet tooth, said hollow shaft being secured to said carriage, and drive means including a pawl mating with said ratchet tooth to rotate said hollow shaft in only one direction, means for positioning said needle directly above the hole in the core, and means for inserting said needle and wire through the core to complete the partial turn of winding on the core which was initiated by rotation of said carriage.

10. A core winding machine in accordance with claim 9 wherein said carriage includes a plurality of rollers mounted on shafts having pinions secured thereto, said core being supported by said rollers, and means for rotating said core through a predetermined angle about its own axis on rotation of said carriage around said carrier, said last mentioned means including a worm on said first shaft, a worm gear mating with said worm and mounted on a shaft on said carriage, and a gear train including said worm gear and said pinions.

11. A core winding machine in accordance with claim 9 wherein said drive means includes a rack and pinions and further comprises a bracket mounting said carriage from said hollow shaft and stop means secured to said rack and mating with the top of said bracket to position said carriage after rotation of said carriage around said carrier.

12. A machine for winding toroidal magnetic cores with wire comprising a carriage for supporting a toroidal magnetic core, a wire loop carrier, means connecting one end of a wire to be wound on the core to said carriage, a needle connected to the free end of the wire, means for placing said wire on said wire loop carrier, means for raising said wire loop carrier, a needle guide assembly above said core for positioning said needle directly above the central hole in the core, means for opening said needle guide assembly to allow said wire loop carrier to pass through and closing said needle guide assembly to position said needle, and means for inserting said needle and said wire through the central hole in the core after said needle has been positioned by said guide assembly.

13. A core winding machine in accordance with claim 12 wherein said needle guide assembly includes an elongated needle guide having a groove therein wherein said needle rests and a mating needle guide, said needle guide assembly being opened and closed as said pair of needle guides are brought together and apart.

14. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, a needle guide assembly located above said core, means for raising said wire loop carrier, means for opening said needle guide assembly to allow said wire loop carrier to pass through and close said needle guide assembly to position said needle directly above the central hole in the core when said needle has been raised to said needle guide assembly, and means for inserting said needle and said wire through the central hole in the core thereby to complete the partial turn of wire about the magnetic core which was initiated by the rotation of said carriage.

15. A core winding machine in accordance with claim 14 wherein said inserting means includes means for retracting said wire loop carrier to release said wire whereby said wire drops through the central hole of said core.

16. A core winding machine in accordance with claim 14 further comprising spring means for returning said wire loop carrier to its normal position to be ready for the placing of the next turn of wire on said wire loop carrier.

17. A core winding machine in accordance with claim 14 wherein said wire loop carrier has a cylindrical upper portion and a slanted lower surface directly beneath said upper portion, said inserting means including means for lowering said wire loop carrier to insert said wire and needle through said core, said wire being released from said carrier on the next rotation of said carriage around said carrier, whereby said wire slides off said lower surface of said carrier and said wire drops through the central hole in said core.

18. A machine for winding toroidal magnetic cores with wire comprising a rotatable carriage for supporting a toroidal magnetic core, a wire loop carrier, means for rotating said carirage around said loop carrier to place an intermediate loop portion of said wire on said carrier and to place a partial turn of wire on the core, means for rotating said core a predetermined angle about its own axis on each rotation of said carriage about said wire loop carrier, means for raising and lowering said wire loop carrier, a needle guide assembly, means for opening and closing said needle guide assembly to allow passage therethrough of said wire loop carrier, and drive means for operating each of said preceding means, said drive means including a single drive cord and motor means for driving said drive cord.

19. A core winding machine in accordance with claim 18 further comprising a control circuit for reversing the direction of said drive cord, said control circuit including said needle guide assembly as an element thereof, a circuit path being closed through said needle guide assembly by a needle extending therein.

20. A machine for winding toroidal magnetic cores with wire comprising a carriage for supporting a toroidal magnetic core, a wire loop carrier, means connecting one end of a wire to be wound on the core to said carriage, a needle connected to the free end of the wire, means for placing the wire on said wire loop carrier, a needle guide assembly located above the core, means including motor means for raising said wire loop carrier so that said needle is positioned by said guide assembly, first circuit means for reversing said motor means to lower said wire loop carrier and insert said needle and wire through the central hole in the magnetic core, and second circuit means for again reversing said motor means after said wire loop carrier is lowered.

21. A core winding machine in accordance with claim 20 wherein said first circuit means includes said needle guide assembly.

22. A core winding machine in accordance with claim 20 wherein said second circuit means includes a microswitch.

23. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, a needle guide assembly located above said core, means for raising said carrier so that said needle is positioned by said needle guide assembly for insertion through the central hole in a toroidal core supported by said rotatable carriage, said raising means including motor means, means for reversing said motor means for lowering said wire carrier and inserting said needle and wire through the central hole in the magnetic core thereby to complete the partial turn of wire about the magnetic core which was initiated by rotation of said carriage, means for reversing the direction of said motor means to raise again said wire loop carrier after the next rotation of said carriage around said carrier, and circuit means for interrupting said motor means after a predetermined number of cycles of operation of said wire loop carrier.

24. A machine for winding toroidal magnetic cores with wire comprising a rotatable carriage for supporting a toroidal magnetic core, a wire loop carrier, means connecting one end of a wire to be wound on the core to said carriage, a needle connected to the free end of the wire, means for rotating said carriage around said loop carrier to place an intermediate loop portion of said wire on said carrier and to place a partial turn of wire on the core, said rotating means including motor means, means for rotating said core a predetermined angle about its own axis on rotation of said carriage around said carrier, a needle guide assembly, first means for reversing the direction of said motor means after rotation of said carriage around said carrier, means including said motor means for raising said carrier so that said needle is positioned by said guide assembly directly above the central hole of the core, second means for reversing the direction of said motor means to lower said wire loop carrier and insert said needle and said wire through the central hole in the core thereby to complete the partial turn of wire about the magnetic core which was initiated by rotation of said carriage, and means for interrupting said motor means after a predetermined number of turns of said wire have been wound on the core.

25. A core winding machine in accordance with claim 24 further comprising means for retracting said wire loop carrier to release said wire whereby said wire drops through said central hole of said core.

26. A core winding machine in accordance with claim 24 wherein said wire loop carrier has a cylindrical upper portion and a slanted lower surface directly beneath said upper portion, said wire being released from said carrier on the next rotation of said carriage around said carrier, whereby said wire slides off said lower surface of said carrier and said wire drops through said central hole of said core.

27. A machine for winding toroidal magnetic cores with wire comprising a rotatable carriage for supporting a toroidal magnetic core, a wire loop carrier including an inner shaft, an outer housing encompassing said inner shaft, spring means within said outer housing, means for securing one end of a wire to be wound on the core to said carriage, means for rotating said carriage around said loop carrier to place an intermediate loop portion of said wire on said carrier and to place a partial turn of wire on the core, means for raising said carrier, means for positioning said wire directly above the central hole in the core, means for lowering said wire loop carrier to insert said wire into the central hole in the core, and means for retracting said inner shaft into said housing to drop said wire through the core thereby to complete the partial turn of wire about the magnetic core which was initiated by rotation of said carriage.

28. A core winding machine in accordance with claim 27 wherein said retracting means comprises a cross-piece at the remote end of said inner shaft and a pair of slanted retracting fingers engaging said crosspiece as said wire loop carrier is lowered, the distance between a first portion of said slanted fingers being less than the length of said crosspiece whereby said crosspiece is initially retracted.

29. A core winding machine in accordance with claim 28 wherein the distance between said retracting fingers adjacent the base thereof is greater than the length of said crosspiece, whereby said inner shaft is returned to its normal position by said spring means within said housing.

30. A machine for winding toroidal magnetic cores with wire comprising a rotatable carriage for supporting a toroidal magnetic core, a wire loop carrier including an inner shaft, an outer housing encompassing said inner shaft, spring means around said inner shaft within said housing, means connecting one end of a wire to be wound on the core to said carriage, a needle connected to the free end of the wire, means for rotating said carriage around said loop carrier to place an intermediate loop portion of said wire on said carrier and to place a partial turn of wire on the core, means for rotating said core a predetermined angle about its own axis on rotation of said carriage around said carrier, a needle guide assembly located above said core, means for raising said carrier so that said needle is positioned by said guide assembly for insertion through the central hole in a toroidal magnetic core supported by the rotatable carriage, means for lowering said wire loop carrier to insert said needle and wire into the central hole in the core, and means for retracting said inner shaft into said housing to drop said wire through the core thereby to complete the partial turn of wire about the magnetic core which was initiated by rotation of said carriage, said retracting means comprising a crosspiece at the remote end of said inner shaft and a pair of slanted retracting fingers engaging said crosspiece as said loop carrier is lowered, the distance between a first portion of said fingers being less than the length of said crosspiece whereby said inner shaft is initially retracted and the distance between said fingers adjacent the base thereof being greater than the length of said crosspiece, whereby said inner shaft is returned to its normal position by said spring means within said housing.

31. A core winding machine in accordance with claim 30 further comprising a locking member positioned on said carrier for locking said wire onto said carrier as said carrier is raised and lowered and means for releasing said locking member before said inner shaft is retracted to drop said wire through said core.

32. A core winding machine in accordance with claim 30 further comprising a pair of tensioning fingers mounted on said carriage for holding said wire before said inner shaft has been retracted.

33. A core winding machine in accordance with claim 30 further comprising an insulating tube positioned directly beneath said central hole of said core for confining motion of said needle after said inner shaft has been retracted.

34. A machine for winding toroidal magnetic cores with wire comprising a rotatable carriage for supporting a toroidal magnetic core, said carriage including a plurality of rollers mounted on shafts having pinions secured thereto and the core being supported by said rollers, a wire loop carrier, means connecting one end of a wire to be wound on the core to said carriage, a needle connected to the free end of the wire, a drive cord, motor means for operating said drive cord, means driven by said drive cord for rotating said carriage around said carrier to place an intermediate portion of said wire on said carrier and to place a partial turn of wire on the magnetic core, said rotating means including a central shaft, a first hollow shaft mounted on said shaft including a ratchet tooth, a bracket mounting said carriage to said hollow shaft, a second hollow shaft mounted on said shaft and having a pawl secured thereto mating with said ratchet tooth to rotate said first hollow shaft in one direction only, a pinion secured to said second hollow shaft and a rack driven by said drive cord engaging said pinion, a needle guide assembly located above the core, means driven by said drive cord to raise said wire loop carrier so that said needle is positioned by said guide assembly for insertion through the central hole in a toroidal magnetic core supported by said rotatable carriage, means driven by said drive cord for opening said needle guide assembly to allow said wire loop carrier to pass through said assembly and for closing said assembly to engage said needle, means for reversing said motor means to reverse the direction of said drive cord and lower said wire loop carrier to insert said needle and wire into the core, and means for dropping said wire off said wire loop carrier thereby to complete the partial turn of wire about the magnetic core which was initiated by rotation of said carriage.

35. A core winding machine in accordance with claim 34 further including means for rotating said core through a predetermined angle about its own axis on each rotation of said carriage around said carrier, said rotating means including a worm on said central shaft, a worm gear mating with said worm and mounted on a shaft on said carriage, and a gear train including said worm gear and said pinions.

36. A core winding machine in accordance with claim 35 further comprising an insulating tube positioned beneath said central hole in said core for confining the motion of said needle after said wire is dropped through said central hole.

37. A core winding machine in accordance with claim 35 further comprising circuit means for reversing the direction of said motor means to reverse the direction of said drive cord.

38. A core winding machine in accordance with claim 37 wherein said circuit means includes said needle guide assembly, said assembly including a first needle guide and a second needle guide insulated from said first needle guide, said needle bridging the circuit between said needle guides when said needle extends into said needle guide assembly.

39. A core winding machine in accordance with claim 37 further comprising means for interrupting said circuit means after completion of a predetermined number of turns of a coil on said core.

40. A core winding machine in accordance with claim 39 wherein said interrupting means includes a plurality of magnetic core counter circuits and means for initially setting said counters so that an output appears simultaneously at the last cores of said counters after said counters have counted said predetermined number of turns.

References Cited in the file of this patent

UNITED STATES PATENTS

| | | |
|---|---|---|
| 1,977,828 | Laib et al. | Oct. 23, 1934 |
| 2,348,889 | Earl | May 16, 1944 |
| 2,657,865 | Bennert et al. | Nov. 3, 1953 |

FOREIGN PATENTS

| | | |
|---|---|---|
| 523,338 | Great Britain | July 11, 1940 |